(12) United States Patent
Jourdan et al.

(10) Patent No.: US 7,428,627 B2
(45) Date of Patent: Sep. 23, 2008

(54) METHOD AND APPARATUS FOR PREDICTING VALUES IN A PROCESSOR HAVING A PLURALITY OF PREDICTION MODES

(75) Inventors: Stephan J. Jourdan, Portland, OR (US); Michael Bekerman, Campbell, CA (US); Ronny Ronen, Haifa (IL); Lihu Rappoport, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1570 days.

(21) Appl. No.: 09/750,150

(22) Filed: Dec. 29, 2000

(65) Prior Publication Data

US 2002/0087850 A1    Jul. 4, 2002

(51) Int. Cl.
*G06F 12/02* (2006.01)
(52) U.S. Cl. .................................. 711/213; 712/240
(58) Field of Classification Search ............. 711/217, 711/213, 218, 204; 712/239, 240, 238
See application file for complete search history.

(56) References Cited

OTHER PUBLICATIONS

Wang, Kai, et al., Highly Accurate Data Value Prediction using Hybrid Predictors, 1997, IEEE Proceedings of the 30th Annual International Symposium on Microarchitecture, pp. 281-290.*

* cited by examiner

*Primary Examiner*—Tonia L. M. Dollinger
(74) *Attorney, Agent, or Firm*—Kenyon & Kenyon LLP

(57) ABSTRACT

A multi-mode predictor for a processor having a plurality of prediction modes is disclosed. The prediction modes are used to predict non-binary values. The predictor is a multi-mode predictor comprising a per-IP ("PIP") table and a next value table. The PIP table includes a plurality of PIP information fields and the next value table includes a plurality of fields. The multi-mode predictor also includes a plurality of prediction modes. The processor includes a set of instructions that index the PIP table to provide a valid signal. The processor also includes a set of predicted values for the set of instructions. The set of predicted values is stored in the PIP table and the next value table. According to the valid signal a hit/miss condition in the next value table, a predicted value is selected from the PIP table or the next value table.

22 Claims, 8 Drawing Sheets

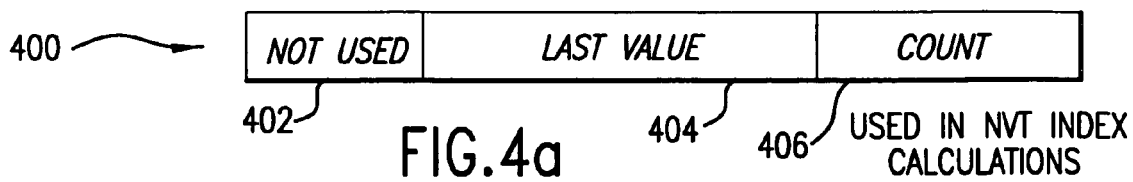
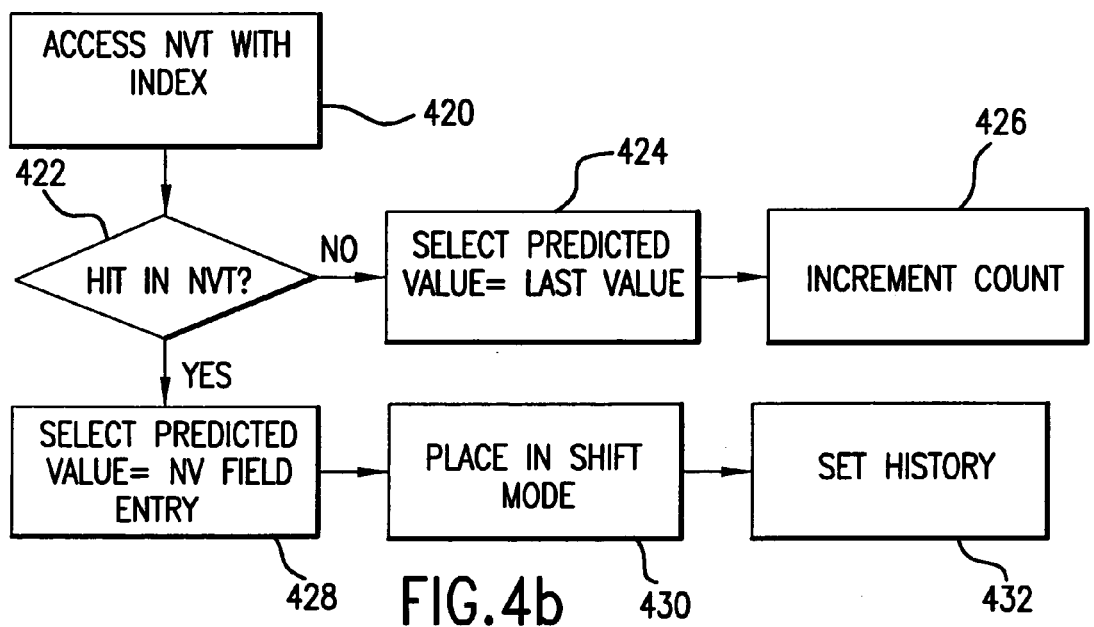
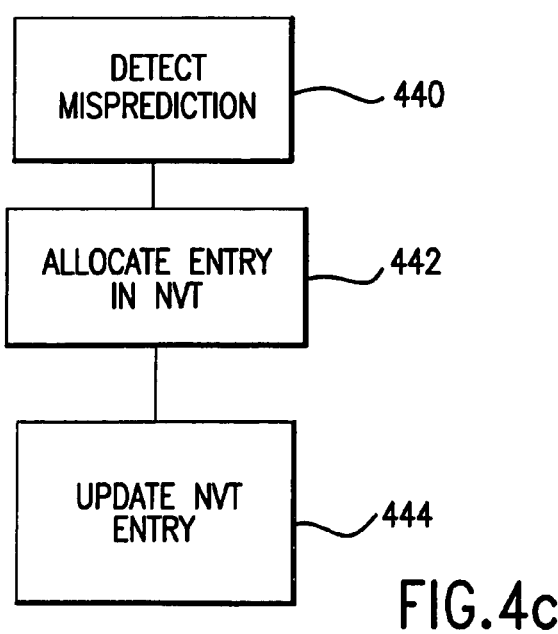

METHOD AND APPARATUS FOR PREDICTING VALUES IN A PROCESSOR HAVING A PLURALITY OF PREDICTION MODES

TECHNICAL FIELD

The present invention relates to predicting values in a processor. More particularly, the present invention relates to a multi-mode non-binary predictor that predicts values in a processor having a variety of prediction modes.

BACKGROUND OF THE INVENTION

Non-binary values appear in many forms across a processor. Non-binary values may be multibit values, for example, up to 32 bits in length, though non-binary values may not be limited to this length. Non-binary values may include data values, data memory addresses and indirect branch targets. Accurately predicting these values may give a substantial performance gain. For example, an instruction that reads a value stored in a register may be dependent on the last instruction that wrote the value into the register. A predicted value enables the processor to break a data dependency chain between the two instructions and increase the instruction level parallelism. As a second example, load instructions fetch data from an addressed memory location into a register. The memory address may be given as a function of immediate values and register values. Before the memory can be read, the memory address should be calculated. If the address could be predicted, it not only would save the time required for its calculation, but it may save the time waiting for any register value required for the address calculation. As another example, an indirect branch may take a different target each time that it is executed. An accurate target prediction has a significant performance potential, as a misprediction leads to a pipeline flush. Moreover, it is expected in future software applications that the relative amount of indirect branches will be higher, which may result in increased performance for these applications.

Processor predictors also may perform data value prediction. Data value prediction uses prediction schemes such as last value prediction, stride prediction and pattern-based prediction. Memory address prediction uses prediction schemes that include last value prediction and stride prediction. Some of these schemes are discussed below.

Non-binary values may exhibit various common behaviors. First, values may follow a general repeating pattern, or shift. For example, a,b,b,c,a,b,b,c,a,b,b,c may be a shift pattern. Second, values may follow a general repeating pattern that contains a long repeating value sequence, or count. For example, a,a,a,a,a,b,c,a,a,a,a,a,b,c may be a count pattern. Third, values may follow a general, but not necessarily repeating, pattern that contains a constant stride sequence, or stride. For example, 2,4,6,8,5,1,2,4,6,8,5,1 may be a stride pattern. Though both stride and count patterns are special cases of the shift pattern, these cases may be predicted in a more efficient manner using special predictor modes. Prediction modes may save predictor space and may provide a better prediction rate for a given predictor space. One such predictor may be a hybrid predictor that predicts each pattern using a different component, and a chooser is used for selecting the component that makes the prediction. The chooser, however, adds another logic components to the predictor for each mode, and impedes transition between prediction modes, thus reducing accuracy for a given predictor space. Thus, a need has arisen for a non-binary predictor with increased efficiency without additional logic components.

BRIEF DESCRIPTION OF THE DRAWINGS

FIG. 4a illustrates a per-IP information field entry for count mode in accordance with an embodiment of the present invention.

FIG. 4b illustrates a flowchart of prediction operations for a predictor in count mode in accordance with an embodiment of the present invention.

FIG. 4c illustrates a flowchart of operations for resolving a misprediction by a predictor in count mode in accordance with an embodiment of the present invention.

DETAILED DESCRIPTION

Embodiments of the present invention include a multi-mode predictor for a processor having a plurality of prediction modes. The prediction modes are used to predict non-binary values. The processor includes a multi-mode predictor comprising a per-IP ("PIP") table and a next value table. The PIP table includes a plurality of PIP information fields and the next value table includes a plurality of fields. The multi-mode predictor also includes a plurality of prediction modes. The processor includes a set of instructions that index the PIP table to provide a valid signal. The processor also includes a set of predicted values for the set of instructions. The set of predicted values is stored in the PIP table and the next value table. According to a hit/miss condition in the next value table, a predicted value is selected from the PIP table or the next value table.

Figure 1:
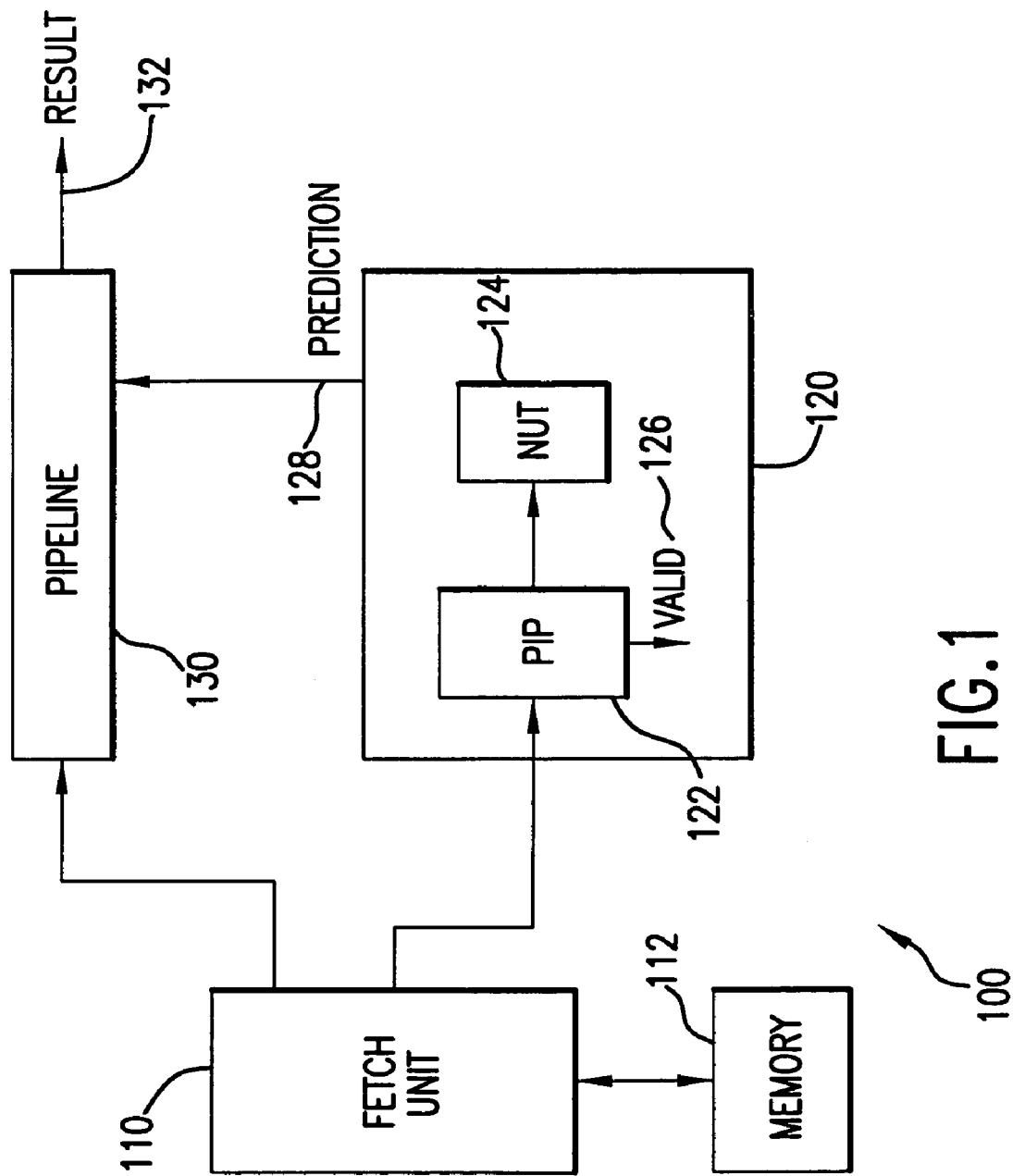
FIG. 1 illustrates a block diagram of a processor having a multi-mode predictor in accordance with an embodiment of the present invention.

FIG. 1 is a block diagram of a multi-mode predictor 120 for use in a PROC 100 in accordance with an embodiment of the present invention. For simplicity, not all functional units of processor 100 are depicted. Processor 100 may be a general processor that executes instructions. Specifically, processor 100 may be an out-of-order processor. Processor 100 may fetch instructions from memory 112 using fetch unit 110. Instructions retrieved from memory 112 by fetch unit 110 are executed in a pipeline fashion within processor pipeline 130. Instructions are decoded to be executed within pipeline 130. For a Complex Instruction Set Computer ("CISC") architecture, processor 100 decodes a complex instruction into one or more micro-instructions. Usually, these micro-instructions define a load-store type architecture, so the micro-instructions involving memory operations are simple load or store operations. The present invention, however, may be practiced for other architectures, such as Reduced Instruction Set Computer ("RISC") or Very Large Instruction Word ("VLIW") architectures.

In a RISC architecture, instructions are not decoded into micro-instructions. Because the present invention may be practiced for RISC architectures as well as CISC architectures, no distinction will be made between instructions and micro-instructions unless otherwise stated, and will simply refer to both of these as instructions.

Multi-mode predictor 120 receives instructions from fetch unit 110 to provide predictions, if applicable. Predictor 120 determines whether the instruction is to be predicted and sends prediction value 128 to pipeline 130. In the case of an indirect branch, prediction result 128 is sent back to fetch unit 110. Prediction value 128 then may be used to increase efficiency in pipeline 130 and fetch unit 110 by providing predicted data values, data memory addresses or branch targets according to one of several prediction modes. In an embodiment of the present invention, the prediction modes are stride, shift or count patterns.

Multi-mode predictor 120 includes a per-IP ("PIP") table 122 and a next value table 124. Tables 122 and 124 are comprised of fields that store prediction values and other information to generate prediction value 128. PIP table 122 may be indexed according to the IP of the instruction received from fetch unit 110. A match result within the PIP table 122 provides a valid signal 126. Valid signal 126 indicates that a prediction may be provided by multi-mode predictor 120. Preferably, valid signal 126 is a "hit" signal that indicates a hit has occurred in PIP table 122. If no valid signal 126, then a miss has occurred, and no prediction will be provided by multi-mode predictor 120.

Next value table 124 may be indexed by PIP table 122 data and the received instruction as a result of valid signal 126. Depending on the information and data, prediction value 128 is provided by either PIP table 122 or next value table 124. The predicted values correlate to the instructions from fetch unit 110 received at multi-mode predictor 120. If an instruction does not correlate to a predicted value, valid signal 126 will not be provided, and a miss condition noted. The predicted value is selected from PIP table 122 or next value table 124 and is provided as predicted value 128.

Figure 2A:
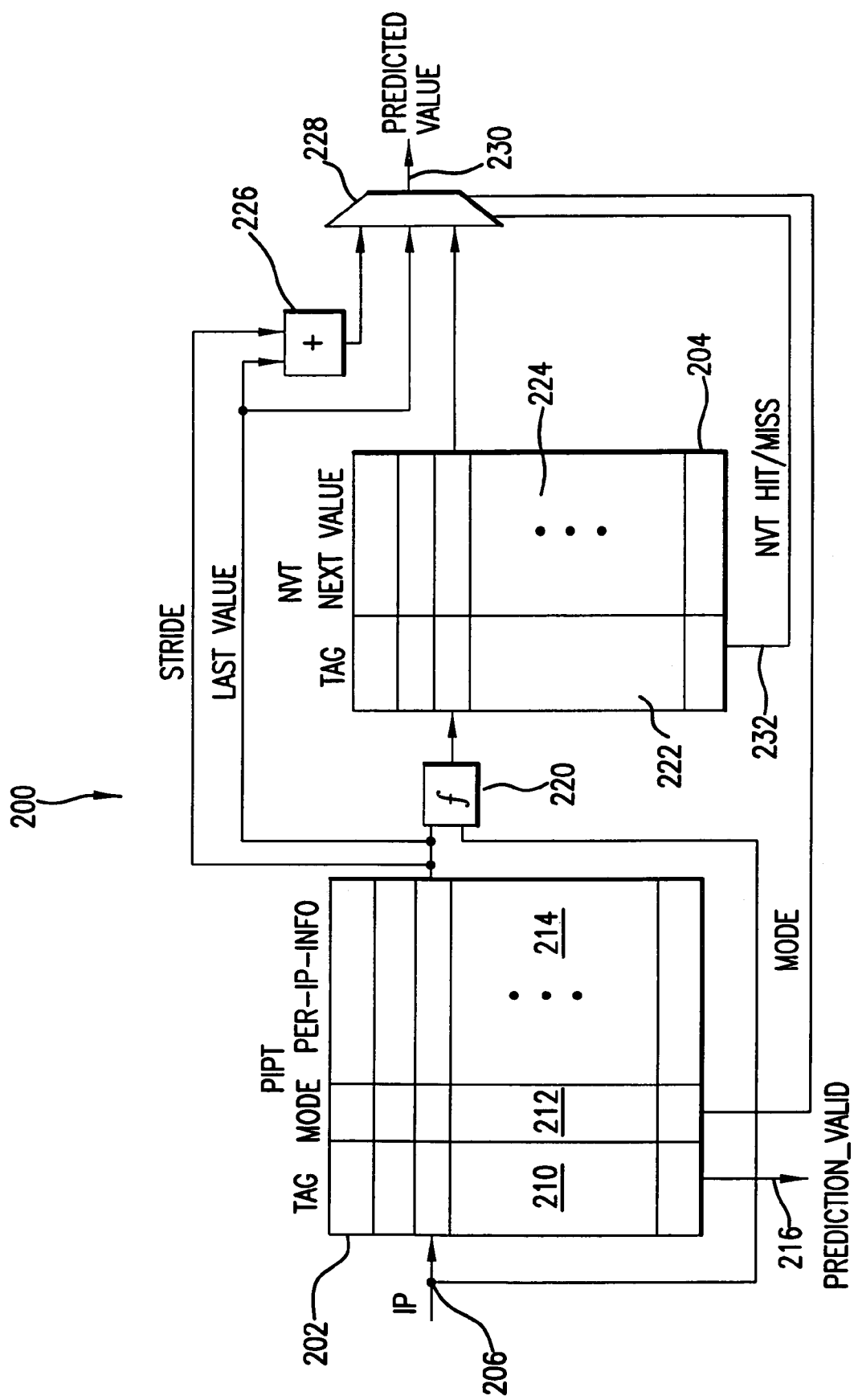
FIG. 2a illustrates a block diagram of a multi-mode predictor in accordance with an embodiment of the present invention.

FIG. 2a depicts a multi-mode predictor 200 in accordance with an embodiment of the present invention. Multi-mode predictor 200 provides predictions for non-binary values within a processor. Multi-mode predictor 200 allows predictions to be made using a combined predictor that can predict in a plurality of prediction modes, such as shift, stride and count. Further, multi-mode predictor 200 may predict transitions between prediction modes.

Multi-mode predictor 200 includes a PIP table 202 and a next value table 204. In an embodiment, PIP table 202 can be organized as a set-associative cache. PIP table 202 may be indexed by instruction pointer 206 for instructions received from an fetch unit 110. PIP table 202 may store per-IP information in per-IP information field 214 for the instructions. Per-IP information may be data that provides a prediction for the indexed instruction. Next value table 204 also may be a set-associative cache. Next value table 204 may be indexed by a fixed function 220 of per-IP information field 214 from PIP table 202 and a subset of instruction pointer 206. In an embodiment of the present invention, fixed function 220 may be an exclusive-OR function. Alternatively, fixed function 220 may be a logic function applicable for indexing next value table 204. The subset of instruction pointer 206 may be several of the least significant bits of instruction pointer 206. In an embodiment of the present invention, the subset of instruction pointer 206 may be the ten least significant bits of instruction pointer 206.

For each instruction for instruction pointer 206, predictor 200 may operate according to one of a plurality of prediction modes. These modes may include shift, count, and stride. Each mode predicts values that exhibit a different behavior. As discussed above, a shift mode typically has a general repeating pattern, such as a,b,b,c,a,b,b,c,a,b,b,c. A count mode has a pattern that contains a repeating value sequence, such as a,a,a,a,a,b,c,a,a,a,a,a,b,c. A stride mode has a pattern that contains a constant stride sequence, such as 2,4,6,8,5,1, 2,4,6,8,5,1.

The size of per-IP information field 214 of PIP table 202 may be fixed for all modes, but the meaning of this field varies from mode to mode. Tag field 210 includes address information for comparison to an input address, such as instruction pointer 206. A hit within tag field 210 by instruction pointer 206 generates valid signal 216. Valid signal 216 indicates a hit has occurred in PIP table 202 and that a predicted value 230 will be provided for the instruction of instruction pointer 206 by predictor 200. A miss within tag field 210 indicates no prediction is to be provided by predictor 200. The source of the prediction value 230 depends on the current mode within mode field 212 of the PIP table 202 for the specific instruction, and on the hit/miss signal 232 of next value table 204.

Next value table 204 may be indexed by the output from fixed function 220. Fixed function 220 receives inputs from instruction pointer 206 and the data from per-IP information field 214. The entry that stores the data within per-IP information field 214 correlates to the hit within tag field 210. Further, mode field 212 provides the mode for the instruction of instruction pointer 206. Fixed function 220 performs a logic function on the received input to index next value table 204. Tag field 222 may include address information for comparison to the index function from fixed function 220 to indicate whether a hit occurs in next value table 204. A hit in tag field 222 correlates with an entry in next value field 224. Further, hit/miss signal 232 is generated by whether a hit occurs in tag field 222. Tag field 222 also correlates with the instruction of instruction pointer 206. Next value table 204 may be generated by processing instructions and providing predictions with predictor 200, or may be pre-fabricated prior to processor implementation.

Logic unit 228 receives various inputs to determine predicted value 230. Hit/miss signal 232 is received from tag field 222 in next value table 204. The mode from mode field 212 also is received from PIP table 202. Logic unit 228 receives last value information from per-IP information field 214. Addition unit 226 provides an input to logic unit 228. Addition unit 226 receives last value and stride information from per-IP information field 214. Logic unit 228 also receives the entry from next value field 224. Logic unit 228 then determines predicted value 230 based on the control inputs received. If hit/miss signal 232 indicates a hit within tag field 222 of next value table 204, then predicted value 230 is the respective entry in next value field 224. If hit/miss signal 232 indicates a miss within tag field 222, then predicted value 230 is the respective entry in per-IP information field 214, with additional manipulations according to the mode. If the mode from mode field 212 is stride, then predicted value 230 is the last value and the stride provided by addition unit 226. If the mode is count or shift, then predicted value is the last value provided by per-IP information field 214. Predicted value 230 preferably is a non-binary value.

Figure 2B:
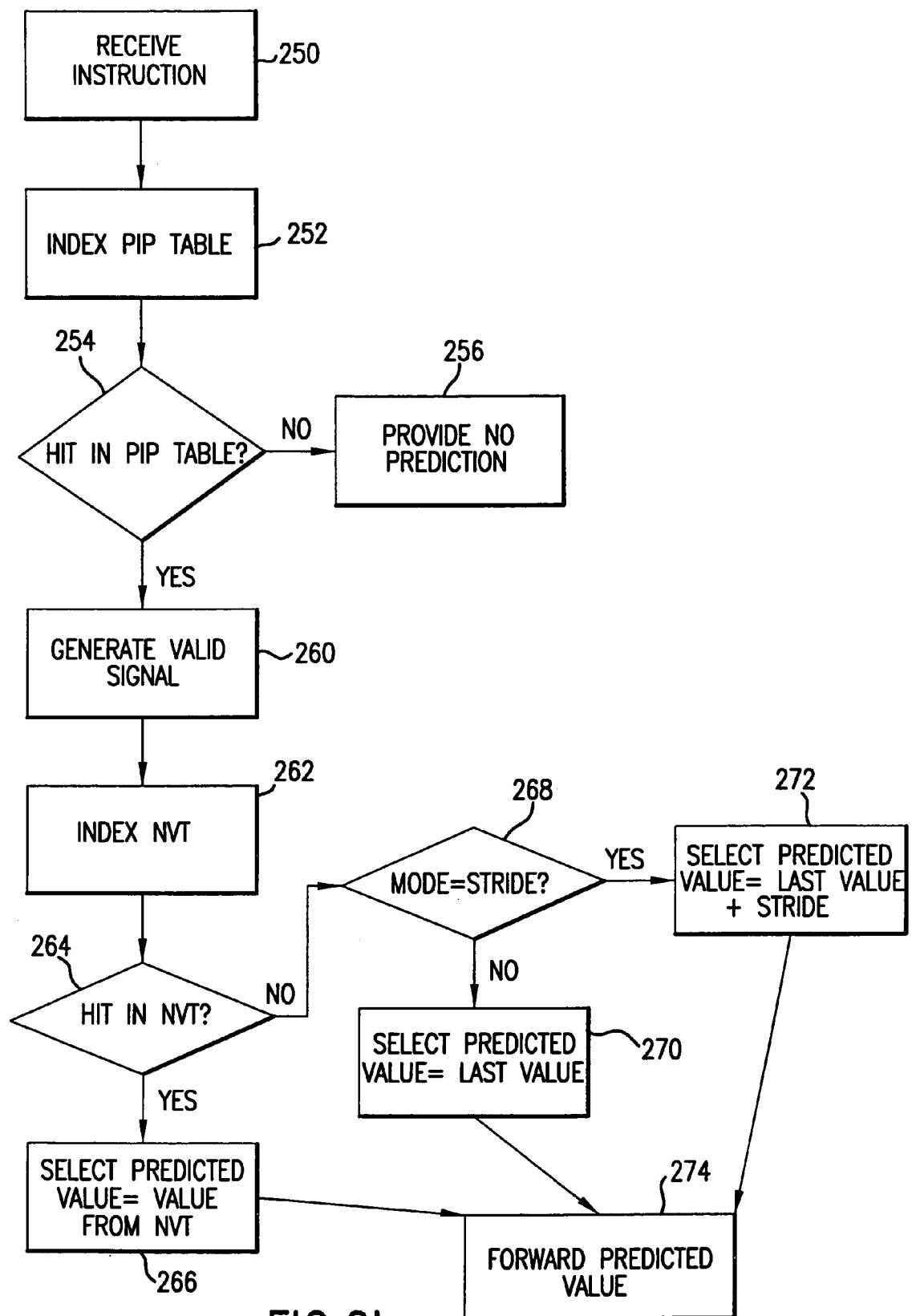
FIG. 2b depicts a flowchart of operations for providing a prediction from a multi-mode predictor in accordance with an embodiment of the present invention.

FIG. 2b depicts a flowchart of operations for providing a prediction from predictor 200 in accordance with an embodiment of the present invention. Embodiments of the present invention may receive an instruction at predictor 200. [Box 250] Instruction pointer 206 points to a memory location in order to fetch the instruction. Embodiments of the present invention may index PIP table 202 with instruction pointer 206. [Box 252] By indexing, PIP table 202 is accessed by predictor 200. Embodiments of the present invention may determine if a hit occurs in PIP table 202. [Box 254] As discussed above, a hit occurs when there is a match for the instruction to the address information in tag field 210 of PIP table 202. If no, then a miss occurs in PIP table 202 and embodiments of the present invention may execute by not providing a prediction for the instruction. [Box 256] A miss indicates that a prediction entry has not been allocated for the received instruction in predictor 200.

If yes, then a hit occurs in PIP table 202 and embodiments of the present invention may execute by generating valid signal 216. [Box 258] Valid signal 216 indicates a prediction is to be given for the received instruction. Embodiments of the present invention may provide a prediction mode for predictor 200 from mode field 212. [Box 260] As discussed below, the prediction mode indicates how the predicted value is to be determined for the received instruction. Embodiments of the present invention include a shift mode, a count mode and a stride mode. Embodiments of the present invention, however, is not limited to these modes, and may include two modes instead of three.

Embodiments of the present invention may index next value table 204 with fixed function 220. [Box 262] Fixed function 220 receives inputs from instruction pointer 206 and PIP table 202, and uses a fixed function to arrive at an index value to access next value table 204. Embodiments of the present invention may determine if a hit occurs in next value table 204. [Box 264] A hit would occur if the index value from fixed function 220 matches an entry in tag field 222 of next value table 204. If yes, then embodiments of the present invention may select predicted value 230 to be the value within next value field 224 corresponding with the indexed value of fixed function 220. [Box 266]

If no, then a miss occurs in next value table 204 and predicted value 230 is to be provided by PIP table 202 from per-IP information field 214. Embodiments of the present invention may determine if the mode from mode field 212 is a stride mode. [Box 268] If no, then predictor 200 may be in count or shift mode, and embodiments of the present invention may select the last value entry stored in the corresponding entry in per-IP information field 214 as predicted value 230. [Box 270] The last value entry may be different values based on the mode. If yes, then embodiments of the present invention may select the last value entry plus a stride value entry as predicted value 230. [Box 272] The last value entry and the stride value entry are stored in the corresponding entry in per-IP information field 214. Embodiments of the present invention may forward predictor value 230 from predictor 200. [Box 274]

Figure 3A:
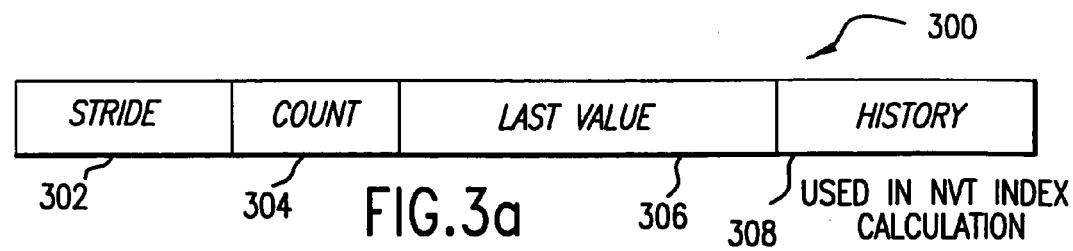
FIG. 3a illustrates a per-IP information field entry for shift mode in accordance with an embodiment of the present invention.

FIGS. 3a-d describe the operations of predictor 200 in shift mode according to embodiments of the present invention. Note that predictor 200 is a local predictor in that the past information, the mode, and the prediction are all given per instruction of instruction pointer 206. FIG. 3a depicts per-IP information field entry 300 for a shift mode in the per-IP information field 214 in accordance with an embodiment of the present invention. Shift mode is used for predicting general repeating patterns based on past values. For example, the sequence a,b,c,d,e,a,b,c,d,e (where a, . . . , e are different values) may be based on the previous value. In this pattern, a is followed by b, b is followed by c, C is followed by d, and so on. More complex patterns have a given value that may be followed by more than a single value and may require longer histories, such as a,a,b,a,a,b. Such a history may require a history of length of two. Because values are usually long, such as 32 bits, it is impractical to save long histories of full values. In order to overcome this issue, embodiments of the present invention may use a exclusive OR-shift history of the past value. This process provides that each new value updates the local history as follows:

history=(history<<shift amount)⊕new value

Here, "history<<shift amount" denotes a shift left of the value in the history by some predefined value for shift amount. The shift serves two purposes. First, it differentiates between different orderings of the previous targets. Second, it ages old targets. Per-IP information field entry 300 in the shift mode may have the structure depicted in FIG. 3a.

Per-IP information field entry 300 includes subfields having their own entries. History entry 308 is the exclusive OR-shift history of previous values. History entry 308 also is used in indexing next value table 204. Last value entry 306 is the value when processing the last instance of the current instruction. Stride entry 302 includes a stride value that is the difference between the last value in last value entry 306 and the value that preceded it. Count entry 304 includes a count value that is the number of times the stride entry 302 is iterated in a row.

Figure 3B:
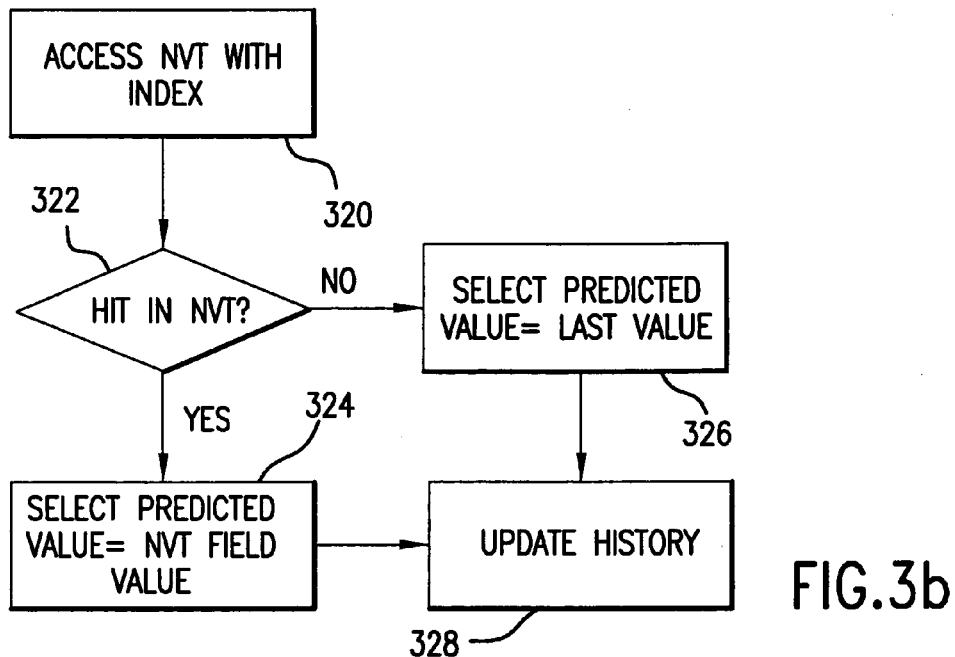
FIG. 3b illustrates a flowchart of prediction operations for a predictor in shift mode in accordance with an embodiment of the present invention.

FIG. 3b depicts a flowchart of prediction operations within predictor 200 while in shift mode in accordance with an embodiment of the present invention. Embodiments of the present invention may access next value table 204 using fixed function 220. [Box 320] As discussed above, fixed function 220 indexes next value table 204 by receiving least significant bits from the instruction pointer 206 and the corresponding history entry 308 in per-IP information field entry 300, as depicted in FIG. 3a. Fixed function 220 may exclusive-OR these values. Embodiments of the present invention may determine if a hit occurs in target field 222 of next value table 204. [Box 322] If yes, then embodiments of the present invention may select the corresponding value in next value field 224 as predicted value 230. [Box 324] If no, then a miss occurs in target field 222, and embodiments of the present invention may select last value entry 306 from per-IP information field entry 300 as predicted value 230. [Box 326] Embodiments of the present invention may speculatively update history entry 308 with new predicted value 230. [Box 328] Further, stride field 302 may be updated by subtracting last value 206 from predicted value 230. Count field 204 may be updated by comparing the new stride value with the one previously recorded, and incrementing the counter on a match, or resetting it on a mismatch. All such updates may be done with the real value from either pipeline 130 when no predictions are performed. On mispredictions, all updates should be repaired.

Figure 3D:
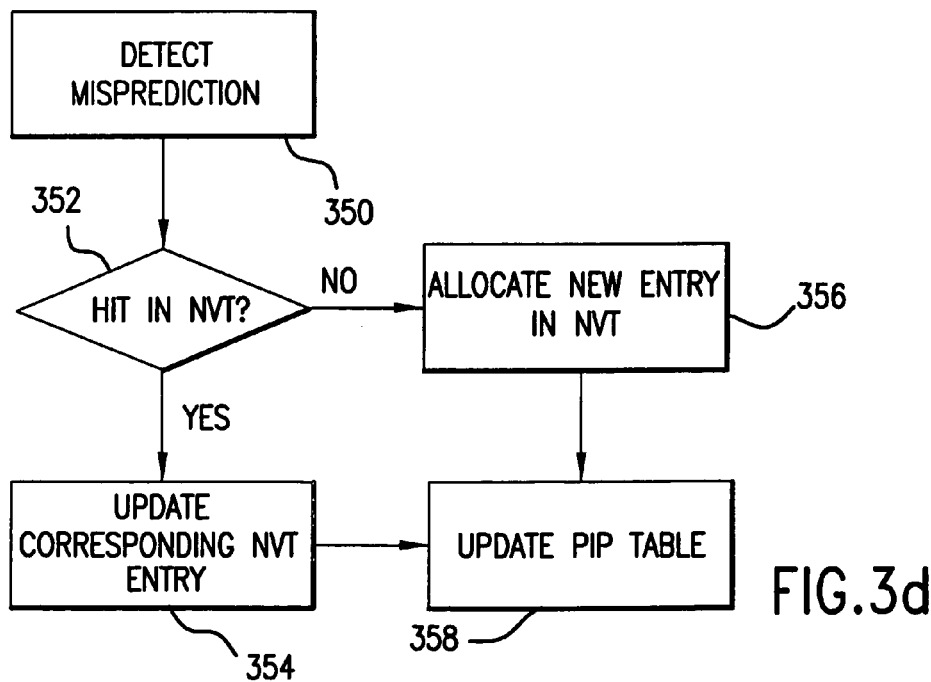
FIG. 3d illustrates a flowchart of operations for resolving a misprediction by a predictor in shift mode in accordance with an embodiment of the present invention.
Figure 3C:
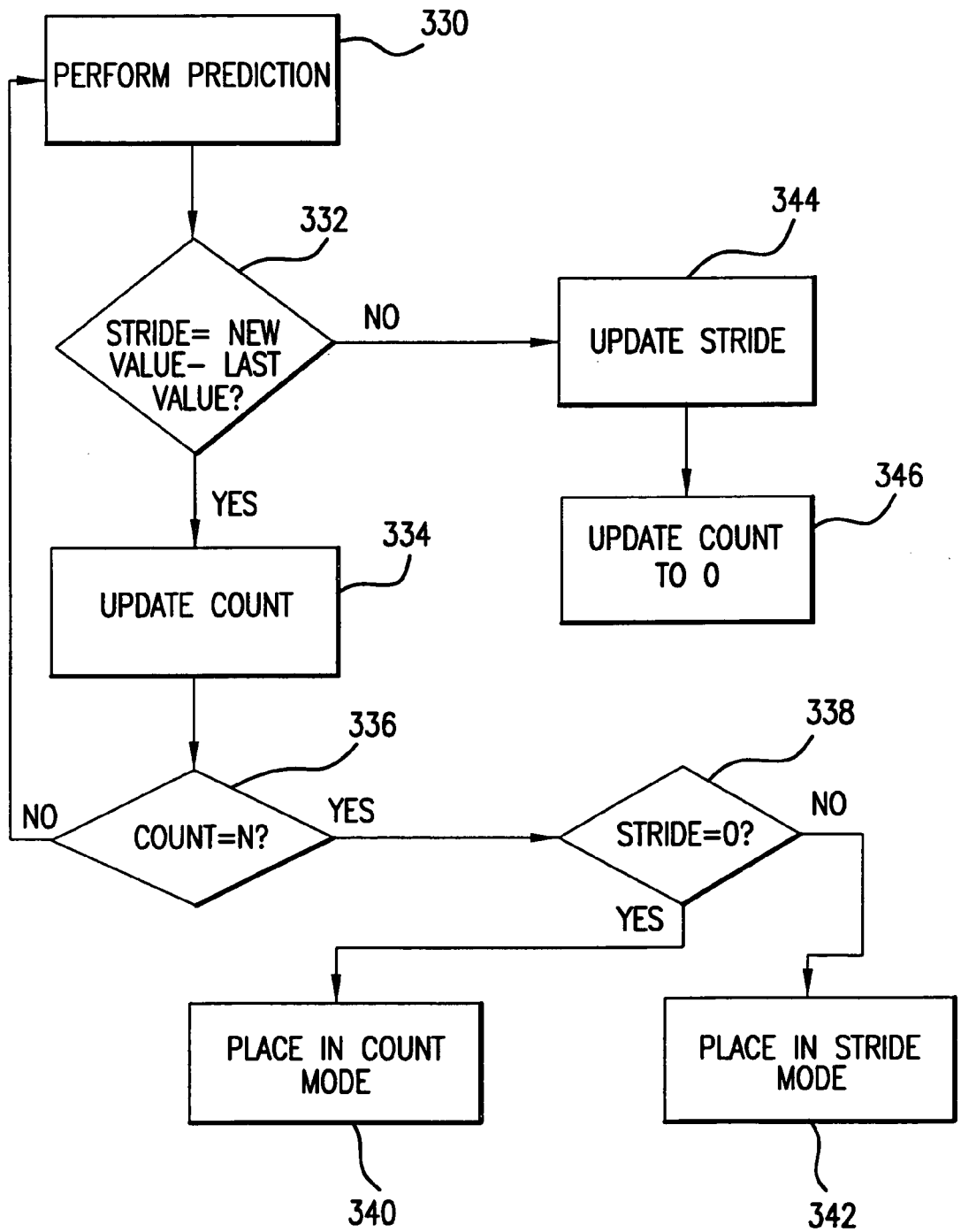
FIG. 3c illustrates a flowchart of operations to change from shift mode to another mode in accordance with an embodiment of the present invention.

FIG. 3c depicts a flowchart of operations to change from shift mode to another mode in predictor 200 in accordance with an embodiment of the present invention. When the same stride d in stride entry 302 is detected n times in a row for some predefined n of count entry 304, predictor 200 should switch from shift mode to either count mode if stride entry 302 is equal to 0, or to stride mode if stride entry 302 is not equal to 0. Embodiments of the present invention may perform shift mode prediction operations. [Box 330] Embodiments of the present invention may determine if the difference between the new predicted value 230 and last value entry 306 is equal to stride entry 302. [Box 332] If yes, then embodiments of the present invention may update count entry 304. [Box 334] Embodiments of the present invention may determine if count entry 304 is equal to n, where n denotes the number of times the shift mode has been used by predictor 200. [Box 336] If no, predictor 200 is returned to the beginning of the flowchart. [Box 330] If yes, then embodiments of the present invention may determine if stride entry 302 is equal to 0. [Box 338] If yes, then embodiments of the present invention may place predictor 200 in count mode. [Box 340] If no, then embodiments of the present invention may place predictor 200 in stride mode. [Box 342] If the determination is no, then embodiments of the present invention may update stride entry 302 to the difference between new predicted value 230 and last value entry 306. [Box 344] Embodiments of the present invention may update count entry 304, or n to 0. [Box 346] Thus, embodiments of the present invention detects whether a stride entry has been predicted n times in a row, and changes the prediction mode accordingly.

FIG. 3d depicts a flowchart of operations for resolving a misprediction by predictor 200 while in shift mode in accordance with an embodiment of the present invention. Embodiments of the present invention may detect a misprediction condition in predictor 200. [Box 350] A misprediction condition occurs when predicted value 230 from previous prediction operations has been resolved and is incorrect. Embodiments of the present invention may determine whether a hit occurred in tag field 222 of next value table 204 when determining predicted value 230. [Box 352] If yes, then embodiments of the present invention may update the corresponding next value entry within next value field 224. [Box 354] If no, then embodiments of the present invention may allocate a new entry in next value table 204 for the corresponding index of fixed function 220 of the new value. [Box 356] Embodiments of the present invention may update last value entry 306 and history entry 308 in per-IP information field 300 in PIP table 202 with the correct values. [Box 358]

Entries in next value table 204 are reduced by using last value entry 306 for predicted value 230 on a next value table 204 miss. For example, in a pattern that contains a value that repeats twice, such as a,b,b,a,b,b, an entry should not be allocated in next value table 204 for predicting the second b. Further, shift mode may switch to count mode when history entry 308 cannot distinguish the information, or when new history =old history. Count entry 304 should be a few bits wide, such as two.

FIGS. 4a-c depict the operations of predictor 200 in count mode according to embodiments of the present invention. FIG. 4a depicts per-IP information field entry 400 in per-IP information field 214 for a count mode. Count mode enables predictor 200 to efficiently predict a pattern that contains a repeating value, such as a,a,a,a,a,a,b, a,a,a,a,a,a,b. If the repeating value appears a relatively small number of times, then the pattern also may be predicted by shift mode. To be predicted by shift mode, however, the sequence of the repeating value should be captured by the exclusive-OR shift history entry 308. If the sequence of the repeating value is long, the exclusive-OR shift history 308 may become saturated, in that the new history is equal to the previous history. In count mode of entry 400, the exclusive-OR history is not used to index next value table 205. Instead, embodiments of the present invention use a function of last value entry 404 and count entry 406. Thus, count mode enables predictor 200 to predict a long sequence with a repeating value beyond that which may be predicted by shift mode. Entry 402 is not used according to this embodiment, but, alternatively, entry 402 may be used to store additional information in entry 400.

In order to predict a mixed shift/count mode pattern, such as a,a,a,a,a,a,b,c,d,d,e,a,a,a,a,a,a,b,c,d,d,e, predictor 200 may switch from shift to count mode, and back to shift mode, and so forth. Count mode may use a single entry in next value table 204, known as an exit entry that predicts b. Thus, in count mode, when a value other than the repeating value is to be predicted, an entry is allocated in next value table 204. The other prediction values may come from PIP table 202 such as last value 404.

Per-IP information field entry 400 includes subfields having their own entries. Entry 402 is not material to the present invention, but may be used for additional operations. Last value entry 404 is the repeating value. Count entry 406 is the number of times last value entry 404 has been iterated in a row.

FIG. 4b depicts a flowchart of prediction operations for predictor 200 while in count mode in accordance with an embodiment of the present invention. Embodiments of the present invention may access next value table 204 using fixed function 220. [Box 420] Fixed function 220 indexes next value table 204 by receiving least significant bits from instruction pointer 206 and least significant bits of last value entry 404 and count entry 406 in per-IP information field entry 400, as depicted in FIG. 4a. Fixed function 220 may exclusive-OR the values from instruction pointer 206 and the values from entry 400. Embodiments of the present invention may determine if a hit occurs in target field 222 of next value table 204. [Box 422] If no, then embodiments of the present invention may select last value entry 404 as predicted value 230. [Box 424] Embodiments of the present invention may increment count entry 406. [Box 426] Preferably, count entry 406 is incremented by one.

If a yes condition is determined, then embodiments of the present invention may select the corresponding value in next value field 224 as predicted value 230. [Box 428] Embodiments of the present invention may place predictor 200 in shift mode. [Box 430] Embodiments of the present invention may set history entry 308 to the exclusive-OR history that would result after the sequence a,a,a,a,a,b, where a is the repeating value, or last value entry 404, and b is the corresponding value in next value field 224, and a repeats n times. [Box 432]

FIG. 4c depicts a flowchart of operations for resolving a misprediction by predictor 200 in count mode in accordance with an embodiment of the present invention. Embodiments of the present invention may detect a misprediction condition in predictor 200. [Box 440] A misprediction occurs when predicted value 230 from previous prediction operations has been resolved and is incorrect. Embodiments of the present invention may allocate an entry in next value table 204. [Box 442] Embodiments of the present invention may update next value field 224 with the correct value. Predictor 200 then is set on shift mode and history is set as discussed above. [Box 444] Count entry 406 of entry 400 should be wider than count entry 304 of entry 300 because, in shift mode, count entry 304 is used for checking a threshold. In count mode, count entry 406 is used for saving the number of iterations for a repeating value in a long sequence. Further, in count mode, count entry 406 is used in index calculations to index next value table 204.

Figure 5A:
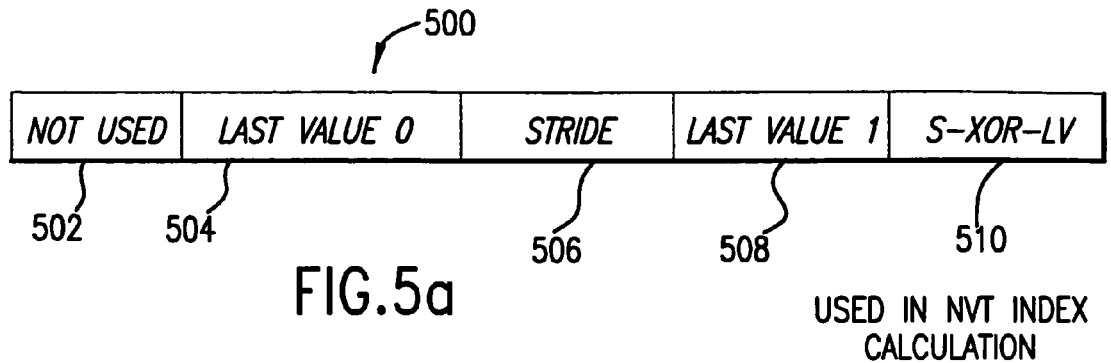
FIG. 5a illustrates a per-IP information field entry for stride mode in accordance with an embodiment of the present invention.
Figure 5B:
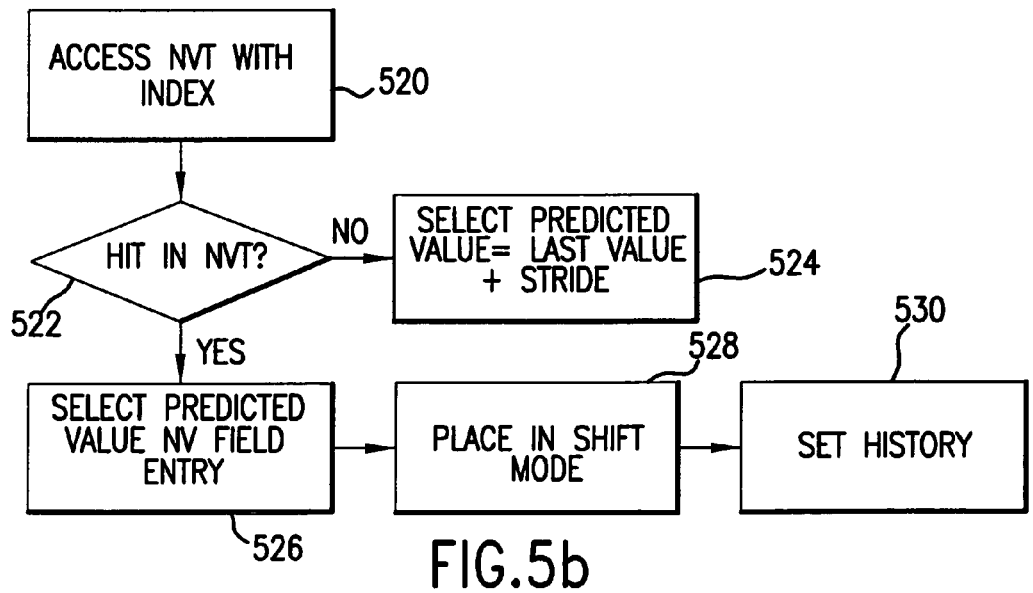
FIG. 5b illustrates a flowchart of prediction operations for a predictor in stride mode in accordance with an embodiment of the present invention.
Figure 5C:
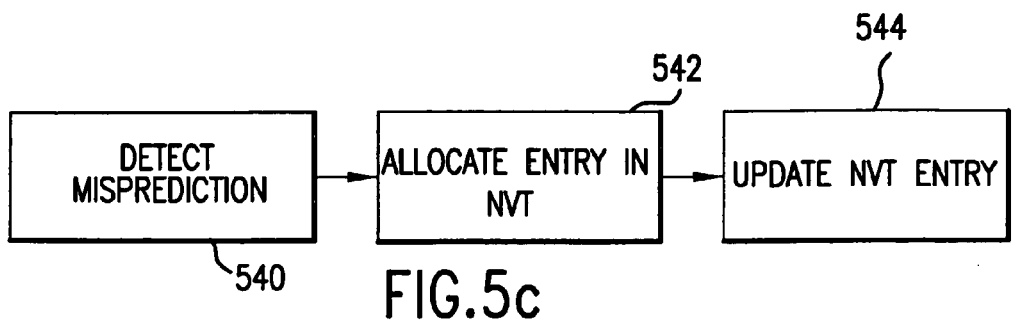
FIG. 5c illustrates a flowchart of operations for resolving a misprediction by a predictor in stride mode in accordance with an embodiment of the present invention.

FIGS. 5a-c depict the operations of predictor 200 in stride mode according to embodiments of the present invention. FIG. 5a depicts per-IP information field entry 500 in per-IP information field 214 for a stride mode in accordance with an embodiment of the present invention. Stride mode enables predictor 200 to efficiently predict a pattern that contains a constant stride sequence, such as 2,4,6,8,5,1,2,4,6,8,5,1. Though shift mode can predict such patterns, it would use an entry in next value table 204 for each element in the pattern. If the constant stride sequence is long, then such a pattern would cause next value table 204 thrashing. Stride mode allows predictor 200 to predict a long constant stride sequence using a single entry in next value table 204, which is the exit entry. Thus, in stride mode, when a value other than the value obtained from the constant stride is to be predicted, an entry is allocated in next value table 204 and predictor 200 switches back to shift mode. Further, once a pattern is identified as a stride pattern, stride mode can predict the pattern in the first time the pattern is encountered. Shift mode would only predict a stride sequence pattern starting at the second time the pattern is encountered, or after shift mode has "learned" the pattern.

To predict a mixed shift/stride mode pattern, predictor 200 may switch from shift mode to stride mode, and back to shift mode, and so forth. Per-IP information field entry 500 includes subfields having their own entries. NU entry 502 is unused bits in entry 500. Last value 0 entry 504 is the most significant bits of the previous value and last value 1 entry 508 is the least significant bits of the previous value. Stride entry 506 is the difference, or "stride", between the last value and the value that precedes it. S-XOR-LV entry 510 is the value of last value 0 entry 504 exclusive-OR'ed with stride entry 506.

FIG. 5b depicts a flowchart of prediction operations for predictor 200 while in stride mode in accordance with an embodiment of the present invention. Embodiments of the present invention may access next value table 204 using fixed function 220. [Box 520] Fixed function 220 indexes next value table 204 by receiving least significant bits from instruction pointer 206 and the least significant bits of last value 1 entry 508 and S-XOR-LV entry 510 of entry 500. Fixed function 220 may exclusive-OR these values. Embodiments of the present invention may determine if a hit occurs in target field 222 of next value table 204. [Box 522] If no, then embodiments of the present invention may select last value 0 entry 504 and last value 1 entry 508 to determine the last value, and may select stride entry 506. [Box 524] The last value and stride entry 506 are added to generate predicted value 230.

If a yes condition is determined, then embodiments of the present invention may select the corresponding value in next value field 224 as predicted value 230. [Box 526] Embodiments of the present invention may place predictor 200 in shift mode. [Box 528] Embodiments of the present invention may set history entry 308 to the exclusive-OR history that would result after the sequence a–(n–2)d, ..., a–2d, a–d, a, b, where a is the last value, d is the stride value of stride entry 506, b is the corresponding value in next value field 224, and n is the threshold count for switching from shift mode to stride mode. [Box 530]

FIG. 5c depicts a flowchart of operations for resolving a misprediction by predictor 200 in stride mode in accordance with an embodiment of the present invention. Embodiments of the present invention may detect a misprediction condition in predictor 200. [Step 540] A misprediction occurs when predicted value 230 from previous prediction operations has been resolved and is incorrect. Embodiments of the present invention may allocate an entry in next value table 204. [Box 542] Embodiments of the present invention may update next value field 224 with the correct value. [Box 544]

Least significant bits of the last value 1 entry 508 are used with stride entry 506 for next value table 204 index calculation because the stride value often is all 0 except for 1 bit for the power of two strides. S-XOR-LV entry 510 may be replaced by other hash functions that preserve the information conveyed by the stride value of stride entry 506. Because predictor 200 uses the values of the stride, the stride value is stored in stride entry 506.

Alternative embodiments of the present invention may include prediction values that do not exhibit constant stride patterns, such as indirect jumps. Predictor 200 may be used only in shift and count modes. Thus, predictor 200 may include a smaller per-IP information field 214 because stride entry 506 is not required. Further, predictor 200 may even do without the last value entry 306 and count entry 304 in shift mode, and switches to count mode when the new history value is equal to the current history. Without last value entry 306, however, predictor 200 may forego the opportunity to prevent repeating values from updating next value table 204 in shift mode.

Figure 6:
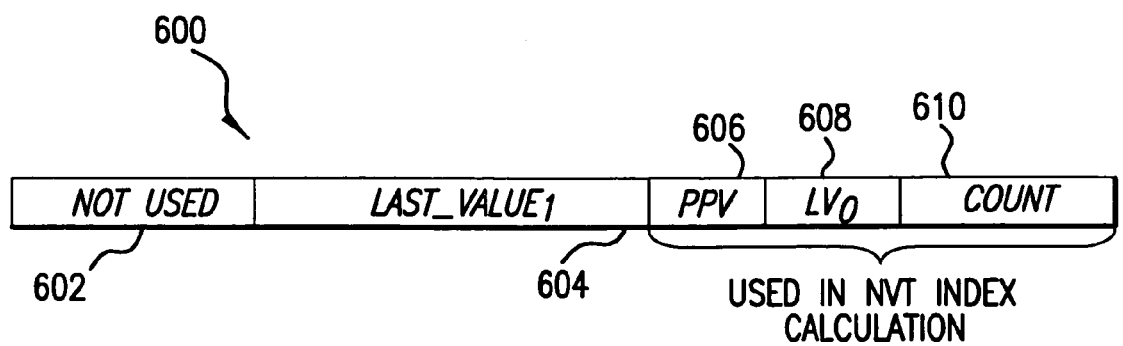
FIG. 6 illustrates a per-IP information field entry in accordance with another embodiment of the present invention.

FIG. 6 depicts a per-IP information field entry 600 in accordance with another embodiment of the present invention. Entry 600 may be an alternative structure for per-IP information field 214 in count mode. Entry 600 includes a partial previous value entry 606 that is the value that occurred before the last value. This structure allows predictor 200 to predict patterns where the value following a sequence of repeating pattern depends on the value preceding that sequence, such as b,a,a,a,a,a,a,c,a,a,a,a,a,a,b,a,a,a,a,a,a,c,a,a,a,a,a,a. In this pattern, the per-IP information is augmented with a partial previous value that is the calculation of the next value table 204 indexing. Thus, referring to entry 600, last value 0 entry 608 is the least significant bits of the last value, and last value 1 entry 604 is the most significant bits of the last value. The index for accessing next value table 204 is calculated by receiving the least significant bits of instruction pointer 206, and partial previous value entry 606, last value 0 entry 608 and count entry 610 from PIP table 202. The instruction pointer 206 information and the PIP table 202 information are exclusive-OR'ed to index next value table 204.

Other embodiments of the present invention may include a shift mode that predicts prediction value 230 as the last value plus stride value on a next value table miss, instead of just using the last value. A benefit may be reducing the entries in next value table 204 for the case of a constant stride sequence because after the first two values of a stride pattern are stored in next value table 204, the stride is learned. A PIP table miss provides a correct prediction. In the case of a repeating value sequence, however, these embodiments may require an extra entry in next value table 204 because after the second repeating value, the stride is set to 0. This process might cause a PIP table 202 miss to predict last value plus 0 to equal last value.

PIP table 202 entries may be augmented with a state machine that provides confidence information. This embodiment enables predictor 200 to generate a prediction for a speculative operation when the confidence of the prediction accuracy is high.

Thus, embodiments of the present invention allow a processor to efficiently and accurately predict non-binary values. Specifically, embodiments of the present invention use special modes for predicting patterns with a repeating value and patterns with a constant stride. This ability enables the predictor to predict long patterns that are otherwise not predictable by a traditional local history predictors and reduces predictor space because of the reduced entries for the next value table. Thus, embodiments of the present invention produces better prediction accuracy than a hybrid predictor for a given size.

Thus, it is apparent that there has been provided, in accordance with the embodiments of the present invention disclosed above, a method and apparatus for predicting branches using a met a predictor. Although the present invention has been disclosed in detail, it should be understood that various changes, substitutions, and alterations may be made herein. Moreover, although software and hardware are described to control certain functions, such functions can be performed using either software, hardware or a combination of software and hardware, as is well known in the art. Other examples are readily ascertainable by one skilled in the art and may be made without departing from the spirit and scope of the present invention as defined by the following claims.

What is claimed is:

1. A method for predicting values in a processor having a plurality of prediction modes, comprising:
    receiving an instruction at a first table;
    generating a valid signal from said first table;
    providing a prediction mode for said instruction;
    determining a hit in a second table, said second table to provide a prediction value, said hit in the second table being determined according to a function of said instruction and said first table; and
    predicting the predicted value according to said hit and said prediction mode.

2. The method of claim 1, wherein said predicting includes selecting said predicted value from said first table.

3. The method of claim 1, wherein said predicting includes selecting said predicted value from said second table.

4. The method of claim 1, wherein said predicting includes selecting said predicted value from said first table or said second table according said hit in said second table.

5. The method of claim 1, wherein said generating includes matching a first table tag with said instruction.

6. The method of claim 5, wherein said generating further includes accessing an information field in said first table correlating to said first table tag.

7. The method of claim 1, further comprising placing said prediction mode in a shift mode.

8. The method of claim 1, further comprising placing said prediction mode in a count mode.

9. The method of claim 1, further comprising placing said prediction mode in a stride mode.

10. The method of claim 1, wherein said providing includes providing said prediction mode from said first table.

11. The method of claim 1, further comprising transitioning to said prediction mode from a previous prediction mode.

12. The method of claim 1, further comprising indexing said second table according to said function and a subset of said instruction.

13. A multi-mode predictor in a processor, comprising:
    a first table indexed by an instruction pointer and having table entries that includes a mode field and an information field;
    a second table indexed by a function of said instruction pointer and said first table; and a hit condition in said second table that correlates to a predicted value of a prediction mode, wherein said second table provides said predicted value.

14. The multi-mode predictor of claim 13, wherein said prediction mode is a shift mode.

15. The multi-mode predictor of claim 13, wherein said prediction mode is a count mode.

16. The multi-mode predictor of claim 13, wherein said prediction mode is a stride mode.

17. A processor, comprising:
    a multi-mode predictor comprising a first table and a second table, wherein said first table includes a plurality of entry fields and said second table includes a plurality of entry fields, and having a plurality of prediction modes;
    a set of instructions that index said first table to provide a signal; and
    a set of predicted values for said set of instructions, said set of predicted values stored in said first table and said second table wherein said set of predicted values includes a first set of predicted values stored in said first table, and a second set of predicted values stored in said second table, wherein second table is to provide a prediction value.

18. The processor of claim 17, wherein said multi-mode predictor further comprises a function that indexes said second table according to said set of instructions and said first table entry fields.

19. The processor of claim 17, further comprising a miss condition in said second table that accesses said first set of predicted values.

20. A multimode predictor, comprising:
    a first table, indexed by an instruction pointer and having first table entries, each having a mode field and a first prediction result field;
    a function unit having an input for instruction pointer data and coupled to said first prediction result fields of the first table entries, and having an output for a calculated pointer;
    a second table indexed by the calculated pointer and having second table entries having second prediction result fields, and wherein the second table provides a prediction value; and
    a selector, having a control input coupled to the mode fields and data inputs coupled to the first and second prediction result fields.

21. The predictor of claim 20, wherein the first prediction result fields comprise a stride sub-field and a last value sub-field.

22. The predictor of claim 20, wherein the first table generates a signal indicating whether the instruction pointer hit the first table.

* * * * *